J. B. CHILDS.

Improvement in Fly-Traps.

No. 129,317.                               Patented July 16, 1872.

Witnesses.
Villotto Anderson
Frank B. Curtis

Inventor.
James B. Childs
Chipman Hosmer &c
attys

UNITED STATES PATENT OFFICE.

JAMES B. CHILDS, OF LEE CENTRE, ILLINOIS.

IMPROVEMENT IN FLY-TRAPS.

Specification forming part of Letters Patent No. 129,317, dated July 16, 1872.

*To all whom it may concern:*

Be it known that I, JAMES B. CHILDS, of Lee Centre, in the county of Lee and State of Illinois, have invented a new and valuable Improvement in Fly-Traps; and I do hereby declare that the following is a full, clear, and exact description of the construction and operation of the same, reference being had to the annexed drawing making a part of this specification and to the letters and figures of reference marked thereon.

Figure 1:
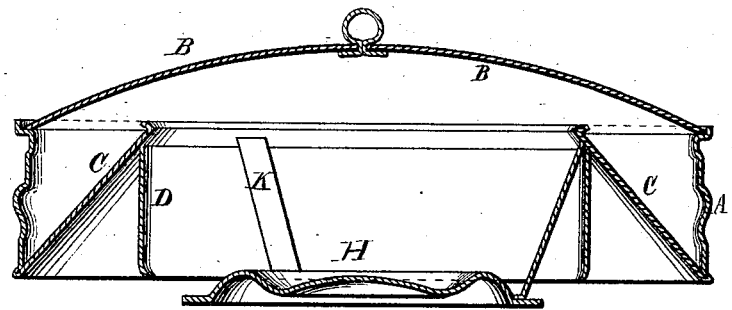
Figure 2:
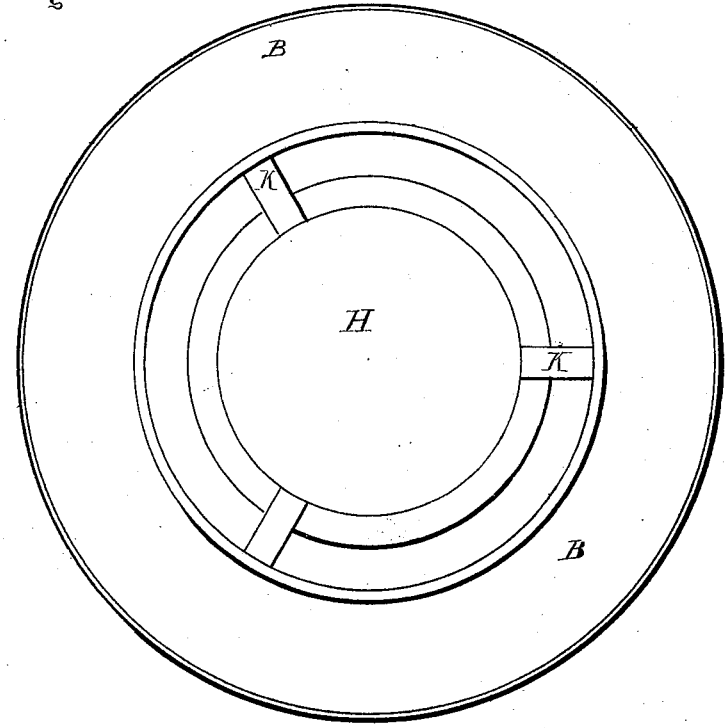

Figure 1 of the drawing is a representation of a central vertical section of my trap. Fig. 2 is a top view of the same.

My invention has relation to means for destroying house-flies; and consists in a novel construction and arrangement of devices intended to serve as an effective apparatus for the purpose mentioned.

My device consists of a metallic dish with a glass cover, the construction of which is as follows, namely:

A represents the rim or upright periphery of my dish, usually corrugated, as shown, the upper corrugation serving as a support or rest for the glass dome or cover B. C represents a wall or strip of metal, united at its base to the bottom of rim A, and extending inward and upward at an angle of about forty-five degrees with the rim A, as shown. D represents an upright wall or rim, made circular, and connected with the inclined wall or rim C in the manner shown. The triangular space between the corrugated wall A and inclined wall C is for the reception of water, into which the flies fall after passing over the upright metallic plate D. The letter H represents a concavo-convex bottom, which is connected with the wall D by means of the supports K, as shown. This bottom H is arranged at a point about an inch, more or less, below the bottom of the walls H and D, and thereby serves to suspend the entire trap (itself excepted) a like distance above the table or pedestal upon which it may be placed. The upper surface of this bottom H is made concave, thereby forming a dish for holding molasses, honey, or other bait designed to call the flies together. The cover B is made of glass, and is rounded upward, as shown, so as to form a dome over the entire trap.

I claim as my invention—

The fly-trap herein described, constructed with the walls A, C, and D, glass dome B, and concavo-convex bottom H, arranged substantially as and for the purpose specified.

In testimony that I claim the above I have hereunto subscribed my name in the presence of two witnesses.

JAMES B. CHILDS.

Witnesses:
   S. C. LAWRANCE,
   WILLIAM WILSON.